INVENTORS
Gerald D. Bonneville,
Adolf Hetke &
BY William N. Free

Charles R. White
ATTORNEY

United States Patent Office 3,702,169
Patented Nov. 7, 1972

3,702,169
FRICTION WELDER WITH FLOATING WORKPIECE FIXTURE
Gerald D. Bonneville, Orchard Lake, Adolf Hetke, Livonia, and William N. Free, Dearborn, Mich., assignors to General Motors Corporation, Detroit, Mich.
Filed Nov. 27, 1970, Ser. No. 93,140
Int. Cl. B23k 27/00
U.S. Cl. 228—2
4 Claims

ABSTRACT OF THE DISCLOSURE

The friction welder has a floating shroud in the tail stock that provides radial support of a workpiece having thin or fragile portions. There is limited shroud rotation relative to the tail stock during the welding process so that torsional forces generated during friction welding will not be transmitted from the workpieces through the shroud to the tail stock. This allows the workpieces to be joined without destruction or damage by the friction welding process. The shroud has a plurality of segments facilitating easy removal of the workpieces from the tail stock.

---

This invention relates to friction welders and more particularly to workpiece-holding fixtures for friction welders which provide a floating peripheral support of a workpiece to prevent its damage or destruction during welding.

Friction welding has been widely employed for joining many types of workpieces. In many cases the robust nature of the workpieces makes them quite suitable for this process. In some cases, however, one or both of the workpieces being welded together have relatively thin and weak parts which do not readily lend themselves to friction welding. Providing additional support to enable these workpieces to resist the applied loads during welding has met with only limited success; in some cases it has been extremely difficult to obtain proper friction welds and still maintain the integrity of the welded parts. The high radial and torsional loads applied to such fragile parts have often resulted in their severe damage or destruction. For example, the friction welding of a rotor hub to a bladed ring of a power turbine rotor is difficult since the blades are relatively thin and fragile and generally must be supported at their tips during welding. This peripheral support is particularly necessary when the geometry of the weld interface consists of two mating cones; when these two parts are forced together during friction welding, a normal force is produced which causes stresses in the ring section of the bladed workpiece. To prevent yielding and distortion of the ring section, fixed shrouds have been secured to the tail stock of the welder which contact the tips of the blades to prevent damage to the ring section. While such shrouds provided improved welds, the thin blades were subjected to high torsional loads because of normal clearances between the stationary holding socket of the welder and the workpiece held thereby. These torsional loads sometimes caused blade distortion and damage. Furthermore, the blades often became press fitted within the shroud, making removal of the two welded parts from the tail stock quite difficult.

In this invention a friction welder is provided which is readily capable of welding such fragile workpieces and which eliminates the transmittal of tangential forces through the outer portion of a workpiece being restrained thereby preventing damage or destruction of the part being welded.

In this invention a free-floating shroud is provided which will support the radial loads produced during a friction welding operation. The shroud is free to rotate while it supports radial loads so that no tangential force is transmitted through the shroud to a stationary retainer. The floating shroud comprises a ring split so that it easily comes apart and releases the welded workpieces after its expansion in the tail stock. The ease of part removal after welding due to the split ring design and the floating shroud which allows the blade ring movement to eliminate the torsional or tangential loading of the turbine blades provide important advancements in friction welding and particularly in the manufacture of a welded turbine rotor composite.

These and other features, advantages and objects of this invention will become more apparent from the following detailed description and drawing in which.

Figure 1:
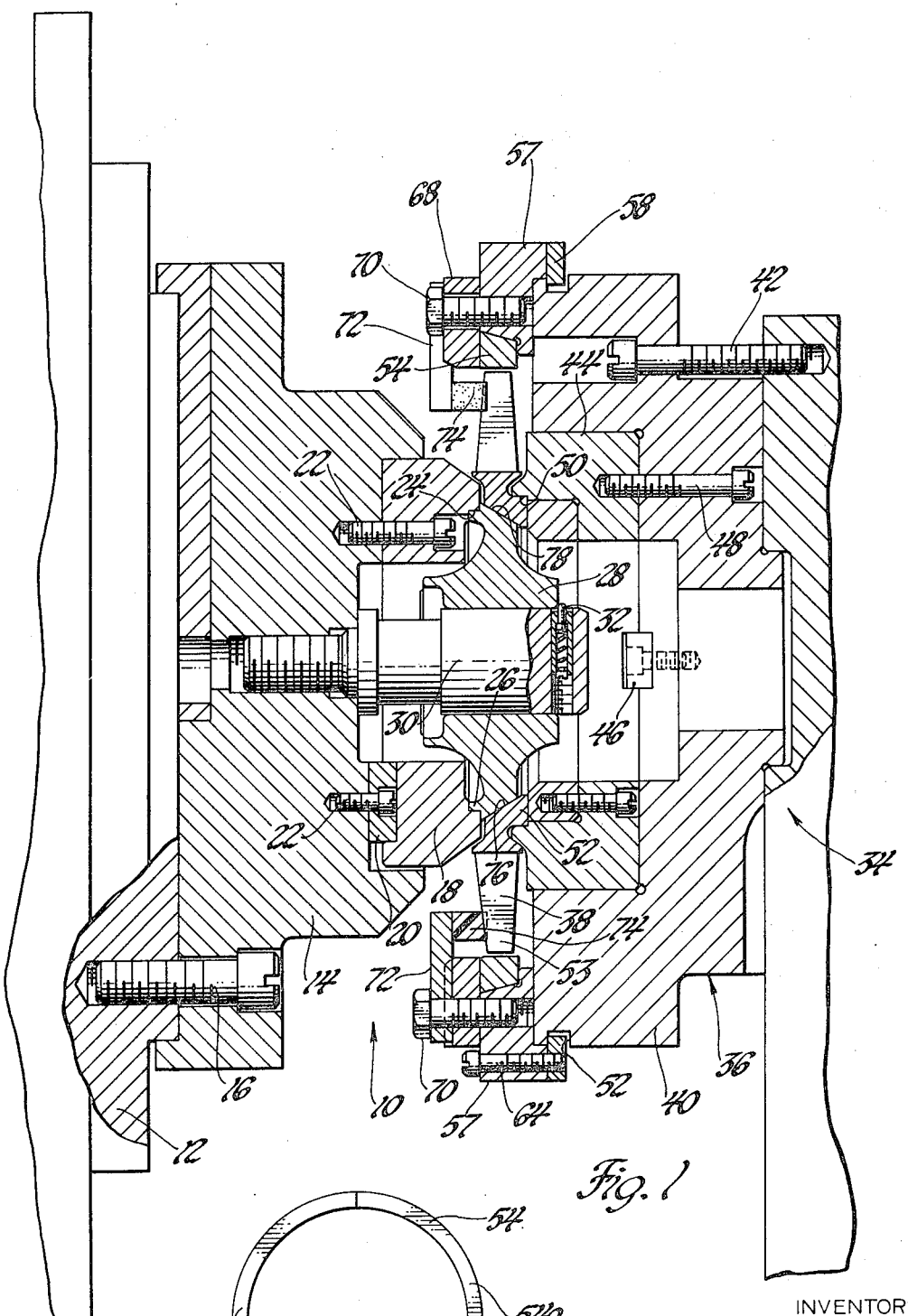
FIG. 1 is a side sectional view of a portion of a friction welder with fixtures holding the workpieces to be welded.
Figure 2:
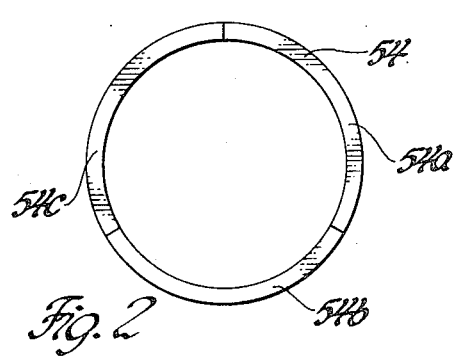
FIG. 2 is a front view of a work-holding ring used with the welder of FIG. 1.

In FIG. 1 a friction welder 10 has a rotatable drive spindle 12 driven by a suitable motor such as that in U.S. Pat. No. 3,627,189, issued Dec. 14, 1971, for Friction Welder, by E. S. Ditto et al. The welder has a head member 14 secured to the end of the spindle by drive keys and by bolts 16. An adapter 18 for holding a first workpiece to be welded is secured to the head member 14 by drive key 20 and by bolts 22.

The adapter has a polygonal drive socket 24 which fits the polygonal-shaped extension 26 of a workpiece 28 which is shown as the hub of a rotor for a gas turbine engine. This hub is formed from a metallic heat-resistant alloy. A central support and pilot member 30 threadedly fastened to the center of the head member 14 projects axially to guide the rotor hub 28 into the drive socket. The pilot member has a radially-disposed, spring-operated detent 32 which retains the hub in axial position after being loaded into the drive socket.

The welder 10 has a tail stock 34 which is fixed against rotation but can be moved back and forth on a longitudinal axis for loading, welding and unloading operations by a suitable motor mechanism such as that disclosed in the above-identified patent. The tail stock carries a fixture assembly 36 for holding a second workpiece 38 stationary for friction welding. The fixture assembly has an adaptor 40 secured to the tail stock by suitable keys and by bolts 42. Also there is a workpiece holder 44 secured to adapter 40 by key 46 and by bolts 48. Workpiece holder 44 has a polygonal socket 50 which receives the mating polygonal shoulder 52 of a power turbine ring that forms the second workpiece 38 that is to be welded to the first workpiece 28. This workpiece is in this embodiment a power turbine ring of a heat-resistant nickel alloy which has a plurality of evenly-spaced blades 53 extending radially outwardly from the periphery of the central annular section.

The fixture includes a floating annular shroud 54 supported by the tail stock disposed around the tips of the blade to assist in supporting the workpiece during friction welding. This peripheral support is contacted by the tips of the blades 53 during friction welding so that it reduces distortion and possible fracture of the ring portion of workpiece 38. The shroud is preferably made in three separate segments 54a, 54b, and 54c and is supported for floating or limited rotation within a retainer ring 57 which is secured to the adapter 36 by a segmented clamping ring 58 that extends into groove 52 formed in the adapter 36. Bolts 64 threaded through the retainer ring 57 and into the clamping ring 58 may be turned so that the clamping ring rigidly secures the retainer ring to the adapter 40.

An annular clamp member 68 is fixed by bolt 70 to the side face of the retainer ring 57 to confine the floating shroud 54 within the retainer ring 57.

To provide for axial support of the blades 50, a plurality of clamp arms 72 are employed with each being secured to the outer side face of clamp member 68 by bolt 70. As shown, the end of each of these clamp arms has an inwardly-facing block 74 of elastomeric material such as neoprene fixed thereto which contacts some of the blades 53 to provide for the desired axial support.

As shown in the drawing, the geometry of the weld interface is provided by the internal conical face 76 of the power turbine ring and the mating external conical face 78 of the hub 28. When the spindle 12 is driven and the workpieces are forced together in a friction welding process, the high normal force produces a stress in the ring and causes the tips of the blades 53 to contact the shroud 54. Even with this contact and with clearance between socket 50 and shoulder 52, no tangential forces will be transmitted to the stationary retainer ring 57 by the blades of the power turbine ring in view of the fact that the shroud 54 turns a limited amount during the welding.

After the welding has been completed, the tail stock is retracted with the parts welded together to an unloading position and the clamp arms 72 and clamp member 78 are removed. The welded rotor is then removed. In view of the fact that the ring 54 is split, it easily comes apart to eliminate a press fit with the end of the blades 50.

This invention is not limited to the details of the construction shown and described for purposes of illustrating the invention for other modifications will occur to those skilled in the art.

What is claimed is:

1. A friction welder comprising a rotatable drive member, holding means operatively connected to said drive member for securely holding and driving a first workpiece, a tail stock, holding means operatively connected to said tail stock for holding a second workpiece to permit said drive member to rotate said first workpiece relatively to said second workpiece when forced together at a common interface under a predetermined load, an outer support member normally separated from said workpieces and operatively disposed in said tail stock for contacting the outer periphery of said second workpiece subsequent to the engagement of said workpieces at said common interface during the friction welding of said workpieces, and mounting means secured to said tail stock mounting said outer support in said tail stock for turning movement therein so that torsional forces transmitted from said first to said second workpiece during the friction welding of said workpieces can effect the limited turning movement of said outer support relative to said tail stock.

2. In combination, a friction welder having a rotatable spindle with holding means for securing a first workpiece thereto and having a tail stock with second holding means for securing a second workpiece thereto, a shroud operatively disposed in said tail stock about the periphery of said second workpiece, said shroud having a contact surface which contacts a peripheral portion of said second workpiece as said workpieces are being welded together, mounting means for mounting said shroud in said tail stock so that the rotary driving of one of said workpieces relative to another can effect the limited movement of shroud relative to said tail stock thereby permitting said parts to be frictionally welded together without damage.

3. In combination, a friction welder having a rotatable spindle, first holding means operatively connected to said spindle for holding a first workpiece, a tail stock for holding a second workpiece from rotation, holding means operatively disposed in said tail stock for holding a second workpiece from rotation, a means for moving said second workpiece into frictional engagement with said first workpiece, said second workpiece having a fragile outer portion, an annular shroud disposed in said tail stock outside of said holding means therein for engaging said outer portion of said second workpiece to limit the radial expansion thereof as the workpieces are relatively rotated, mounting means for movably mounting said shroud in said tail stock so that torsional forces developed during the friction welding of said workpieces will effect a turning movement of said ring relative to said tail stock to thereby prevent damage of said workpieces.

4. The friction welder of claim 3 wherein said interface of said workpieces comprises mating conical surfaces which causes said second workpiece to radially expand into contact with said shroud, and wherein said shroud comprises a plurality of separate segments which fit together to form a ring within said tail stock.

References Cited

UNITED STATES PATENTS

| | | | |
|---|---|---|---|
| 3,393,851 | 7/1968 | Funk et al. | 228—2 |
| 3,442,431 | 5/1969 | Funk et al. | 228—2 |
| 3,571,906 | 3/1971 | Barth et al. | 228—2 |
| 3,606,968 | 9/1971 | Loyd | 228—2 |

JOHN F. CAMPBELL, Primary Examiner

R. J. CRAIG, Assistant Examiner

U.S. Cl. X.R.

29—470.3; 156—73